No. 784,002. PATENTED FEB. 28, 1905.
M. F. HILL.
ROLLER BEARING.
APPLICATION FILED JAN. 13, 1902.
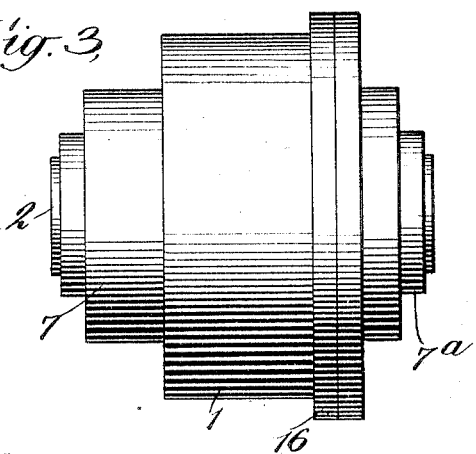
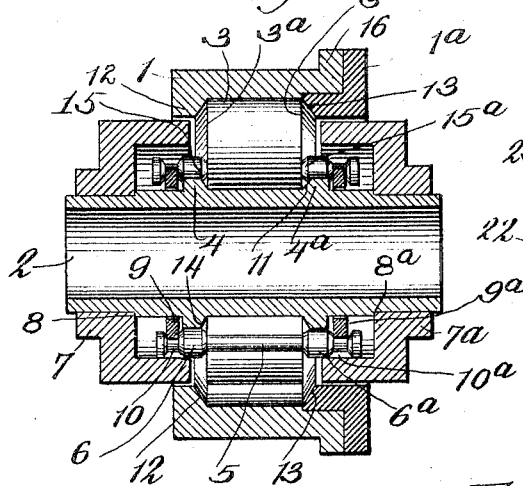
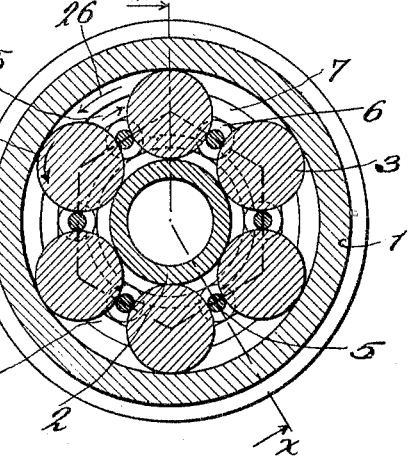
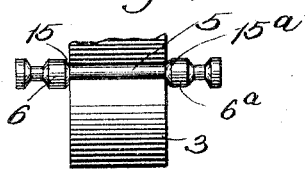
WITNESSES:
Eli J Blair.
Palmer Coolidge.
INVENTOR
Myron Francis Hill
BY
Nicholas M Goodlett Jr.
his ATTORNEY No. 784,002.

Patented February 28, 1905.

UNITED STATES PATENT OFFICE.

MYRON FRANCIS HILL, OF BROOKLINE, MASSACHUSETTS.

ROLLER-BEARING.

SPECIFICATION forming part of Letters Patent No. 784,002, dated February 28, 1905.

Continuation of application Serial No. 693,724, filed October 17, 1898. This application filed January 13, 1902. Serial No. 89,474.

*To all whom it may concern:*

Be it known that I, MYRON FRANCIS HILL, a citizen of the United States, residing at Brookline, in the county of Norfolk and State of Massachusetts, have invented a new and useful Improvement in Roller-Bearings, of which the following is a full and accurate description.

This invention relates to improvements in roller-bearings.

The invention seeks, among other things, to provide a roller-bearing which shall be durable in its construction and not easily subject to breakage or derangement of its parts and one in which the parts shall reliably coöperate with friction reduced to a minimum.

The invention seeks to prevent derangement of the main rollers due to end thrust, as well as derangement of such rollers due to other causes.

In all roller-bearings there are various forces constantly at work tending to derange the main rollers. If these forces, or any of them are substantially effective the rollers twist or become otherwise deranged. This, of course, greatly increases friction and is liable to destroy the bearing. It is not possible to eliminate all of these forces which tend to derange the main rollers. Some of them are due to the very slight and ever-present imperfections in the size and shape of the rollers or the race in which they run. The slightest deviation from mathematical accuracy in the size and shape of the rollers or the race will derange the rollers if not counteracted. Again, unequal expansion and contraction, due to heat and cold, will produce the same result. Moreover, the bearing in many cases is subject to derangement due to end thrust on the main rollers. This end thrust is especially severe when the bearing is applied to a vehicle and is required to sustain the external end thrust on the bearing. In this case the bearing would act as a journal and thrust bearing—that is, a bearing in which the load is partly at a right angle to the axis and partly parallel to the axis. This external end thrust would be less severe where the bearing is applied to a shaft for driving machinery and where the external thrust is counteracted by means outside of the bearing itself. In this case the bearing would act as a pure journal-bearing—that is, one in which the load is at a right angle to the shaft.

This invention recognizes the presence of the various forces tending to derange the main rollers, but provides effectual means to counteract their effect, so that the efficiency of these rollers may be reliably preserved and the life of the bearing prolonged. Moreover, in providing such means the invention utilizes rolling surfaces instead of sliding surfaces to counteract the various forces tending to derange the main rollers. Thus not only are these latter forces effectually overcome, but they are overcome with the least possible friction. All of these results, furthermore, are accomplished by a combination of parts, few in number, of great simplicity and compactness in arrangement, and of great durability. The simplicity of the bearing contributes largely to the ease and accuracy of manufacture.

The invention consists of the various combinations of features herein set forth, and particularly pointed out in the claims.

The accompanying drawings, forming part of this specification, and in which like reference-numerals designate corresponding parts, show one embodiment of the invention.

In said drawings, Figure 1 is a longitudinal sectional elevation of the bearing on the line $x$ $x$ of Fig. 2. Fig. 2 is a central sectional elevation of the bearing, taken on a vertical plane at right angles to the plane of Fig. 1. Fig. 3 is an exterior side elevation of the bearing. Fig. 4 is a detail view showing the arrangement of two main rollers and the interposed separator-roller.

Referring now more particularly to the embodiment shown in the drawings, 1 is an outer sleeve adapted to fit within a vehicle-hub or other box.

2 is an inner sleeve concentric with sleeve 1 and adapted to receive a vehicle axle, shaft, or other support, or it may itself constitute the axle, shaft, or support. These two sleeves constitute concentric walls, forming the race in which work the rollers of the bearing.

3 represents the main rollers of the bearing.

5 represents the separator-rollers, one of which is interposed between each pair of the adjoining main rollers. The separator-rollers 5 are so arranged that the axes of each lies in the same plane as the axes of the two adjoining main rollers, as seen in Fig. 2. The main rollers and the race in which they run are so formed and arranged that the main rollers are free to twist in the race within the limits allowed by the separator-rollers, which latter by their counteracting force operate to preserve and maintain the parallelism of the main rollers. To this end the separator-rollers are provided with guiding edges which coöperate with corresponding guiding edges on the main rollers, so that the guiding edges of the separator-rollers, contacting with the corresponding guiding edges of the main rollers, maintain the parallelism of the roller system. There are various ways in which these guiding edges on the main rollers and on the separator-rollers may be arranged and formed to effect this result. In the preferred arrangement and as shown in the drawings the guiding edges of the main rollers are formed near their peripheries and at their ends, and the corresponding guiding edges of the separator-rollers are formed on the inner sides of enlargements formed on the ends of these separator-rollers.

$3^a$ and $3^b$ are the guiding edges of the main rollers.

6 and $6^a$ are the enlargements on the ends of the separator-rollers, these enlargements projecting beyond the main rollers.

15 and $15^a$ are the guiding edges of the separator-rollers, formed on the inner edges of enlargements 6 and $6^a$. These guiding edges are arranged so as to work on the main rollers at an angle to the axes thereof. There is an especial utility in this because the extent of contact-surface of the main rollers and separator-rollers at their guiding edges is thereby increased and the friction at these guiding edges is kept at a minimum. To this end these guiding edges 15 and $15^a$ are beveled edges, as shown in the drawings. These guiding edges 15 and $15^a$ work on the guiding edges $3^a$ and $3^b$ at opposite ends of the main rollers, so that the strain on the former is exerted longitudinally of the separator-rollers—that is, in the direction of great resistance. The only other strain on the separator-rollers is the crushing strain upon their bodies from the bodies of the main rollers. Both of these strains are easily resisted without any danger of breakage. The bodies of the separator-rollers and of the main rollers are preferably made plain. In this way the greatest strength is obtained with the least amount of metal and accuracy and ease of manufacture are promoted. It will be seen that the coöperating guiding edges of the main rollers and separator-rollers, as described, effectually operate to counteract the various forces which tend to throw the main rollers out of parallelism. It will also be seen that the main rollers are free to twist out of parallelism except for the restraint of the guiding edges of the separator-rollers. Thus the main rollers are not liable to bind or jam in the race.

7 and $7^a$ are retainer-caps fixed by suitable means to the sleeve 2. As shown in the drawings, they are driven on the sleeve and against the shoulders 8 and $8^a$, so that they fit firmly in place. These retainer-caps operate to prevent outer radial displacement of the separator-rollers. These retainer-caps fit within the open ends of the sleeve 1 with sufficient clearance for free rotation of this sleeve and serve also to protect the interior parts of the bearing from dirt or external interference. Means are also provided in the bearing to prevent inner radial displacement of the separator-rollers. For this purpose ribs 4 and $4^a$, formed on the inner sleeve 2, may be employed. The free-running rings 9 and $9^a$ may also be employed for this same purpose. These ribs 4 and $4^a$ are disposed in the same vertical planes as the enlargements 6 and $6^a$ on the separator-rollers. The free-running rings 9 and $9^a$ fit within the grooves 10 and $10^a$, formed on the ends of the separator-rollers 5 beyond the enlargements. When the bearing is in operation, the separator-rollers 5 move round the axis of the bearing, each with its axis in the plane of the axes of the two adjoining main rollers, so that the separator-rollers scarcely touch either the rings 9 and $9^a$ or the ribs 4 and $4^a$. The separator-rollers are kept in their places by the adjoining main rollers.

The main rollers do not operate to squeeze or wedge the separator-rollers radially outward or radially inward, because of the relative positions of the main and separator rollers, as heretofore described, the main rollers contacting with an interposed separator-roller upon diametrically opposite sides thereof.

In order that end thrust on the main rollers which would operate to destroy the parallelism of these main rollers may be effectually counteracted, guiding edges are formed on the race to coöperate with the main rollers. In the best arrangement and as shown in the drawings these guiding edges on the race coöperate with the same guiding edges on the ends of the main rollers with which the separator-rollers coöperate. Moreover, in the best form the guiding edges on the race are arranged so as to work on the main rollers at an angle to the axes thereof, so that the extent of contact may be increased, thereby reducing friction. To this end the guiding edges on the race are beveled. As shown in the drawings, the inner wall of the race is provided with beveled guiding edges 11 and 14, formed, respectively, on the inner sides of ribs $4^a$ and 4. The outer wall of the race is also provided with beveled guiding edges 12 and 13, formed on the outer sleeve 1.

The bearing is subject to end thrust, varying in its character and severity in accordance with the varying conditions under which the bearing is used. To resist this end thrust, the race should be provided with at least two guiding edges, which coöperate with the main rollers. Where the bearing is used as a pure journal-bearing, special means may be provided outside of the bearing itself to counteract whatever external end thrust may exist, and so maintain the inner and outer sleeves in accurate alinement. In this case whatever end thrust on the rollers arises will be internal thrust, due to the drift of the rollers. This end thrust would not be severe and would be effectually resisted in one direction either by the guiding edge 12 on the outer sleeve or by the guiding edge 14 on the inner sleeve, or by both. It will be resisted in the opposite direction either by the guiding edge 13 on the outer sleeve or by the guiding edge 11 on the inner sleeve, or by both. If the bearing were used as a journal and thrust bearing and so were required to sustain external end thrust in addition to the internal end thrust, then it would be necessary to employ at least a guiding edge, as 13, on the outer sleeve and the diagonally opposite guiding edge, as 14, on the inner sleeve to sustain end thrust in one direction. To sustain end thrust in the opposite direction, guiding edges 12 and 11 would be necessary. If the bearing were subject to this external end thrust in both directions, then both pairs of guiding edges on the sleeves would be necessary.

The separator-rollers themselves operate to counteract any twisting of the main rollers due to end thrust. This action of the separator-rollers is important at all times, but is especially so in the case of external end thrust, in which case the strain on the separator-rollers is likely to be very severe. This will be better appreciated when it is understood that if the end thrust on the main rollers or any of them occurs at a time when these rollers are slightly deflected from the direction of thrust the rollers will tend to twist and with a force directly dependent upon the force of the thrust. Under these circumstances the separator-rollers, by the action of their guiding edges upon the main rollers, perform an important office in counteracting this tendency of the main rollers to twist and in helping to sustain end thrust.

To facilitate the assembling of the parts, one end, 1ª, of the sleeve 1 is made as a separate piece, and after the parts are assembled it is securely fastened in place to the body of the sleeve. In practice the bearing has been found to give satisfactory results when the parts have the following dimensions: diameter of the main rollers 3, .323 of an inch; diameter of the body of the separator-rollers 5, .077 of an inch; diameter of the enlargements of the separator-rollers 5, .134 of an inch; diameter of the retainer-caps, (inside,) .833 of an inch; external diameter of the sleeve 2, where the main rollers work, .479 of an inch; the internal diameter of the sleeve 1, 1.125 inch.

The direction of travel of the parts of the bearing is indicated by the arrows in Fig. 2. Supposing the hub to be traveling in the direction of the arrow 22, then the sleeve 1 will of course travel in the same direction. This would cause the main rollers 3 to rotate in the direction of the arrow 23 and the separator-rollers to rotate in the opposite direction, as indicated by arrow 25. Both the main and separator rollers would of course travel about the shaft in the direction of arrow 26.

It is to be understood that the invention is not limited to the precise embodiment thereof as shown in the drawings, but that its details may be varied without departing from the scope of the invention as set out in the claims.

I claim—

1. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers, each separator-roller working with its axis in substantially the same plane as the axes of the adjoining main rollers, the main rollers having guiding edges and the separator-rollers having coöperating guiding edges to keep the main rollers in parallelism, said main rollers being free to twist within the limits allowed by the separator-rollers; and means to prevent radial displacement of the separator-rollers.

2. In a roller-bearing, the combination of inner and outer concentric walls forming an annular space and together constituting a race; main rollers working in said race, the race having guiding edges coöperating with the main rollers near their peripheries and operating to sustain end thrust of said rollers; separator-rollers between the main rollers, each separator-roller working with its axis in substantially the same plane as the axes of the adjoining main rollers, the main rollers having guiding edges and the separator-rollers having coöperating guiding edges to keep the main rollers in parallelism, said main rollers being free to twist within the limits allowed by the separator-rollers; and means to prevent radial displacement of the separator-rollers.

3. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers each separator-roller working with its axis in substantially the same plane as the axes of the adjoining main rollers, the main rollers having guiding edges near their peripheries and the separator-rollers having coöperating guiding edges to keep the main rollers in parallelism, said main rollers being free to twist within the limits allowed by the separator-rollers; and means to prevent radial displacement of the separator-rollers.

4. In a roller-bearing, the combination of inner and outer concentric walls forming an annular space and together constituting a race; main rollers working in said race, the race having guiding edges coöperating with the main rollers near their peripheries and operating to sustain end thrust of said rollers; separator-rollers between the main rollers, each separator-roller working with its axis in substantially the same plane as the axes of the adjoining main rollers, the main rollers having guiding edges near their peripheries and the separator-rollers having coöperating guiding edges to keep the main rollers in parallelism, said main rollers being free to twist within the limits allowed by the separator-rollers; and means to prevent radial displacement of the separator-rollers.

5. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers, each separator-roller working with its axis in substantially the same plane as the axes of the adjoining main rollers, the main rollers having guiding edges and the separator-rollers having coöperating beveled guiding edges to keep the main rollers in parallelism, said main rollers being free to twist within the limits allowed by the separator-rollers; and means to prevent radial displacement of the separator-rollers.

6. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers, each separator-roller working with its axis in substantially the same plane as the axes of the adjoining main rollers, the main rollers having guiding edges and the separator-rollers having coöperating guiding edges to keep the main rollers in parallelism, said main rollers being free to twist within the limits allowed by the separator-rollers and the guiding edges of each main roller working between the coöperating guiding edges of the adjoining main rollers; and means to prevent radial displacement of the separator-rollers.

7. In a roller-bearing, the combination of inner and outer concentric walls forming an annular space and together constituting a race; main rollers working in said race; separator-rollers between the main rollers, each separator-roller working with its axis in substantially the same plane as the axes of the adjoining main rollers, the main rollers having guiding edges, the separator-rollers having coöperating guiding edges to keep the main rollers in parallelism, and the race having guiding edges coöperating with the said guiding edges of the main rollers and acting to sustain end thrust of said main rollers, said main rollers being free to twist within the limits allowed by the separator-rollers; and means to prevent radial displacement of the separator-rollers.

8. In a roller-bearing, the combination of inner and outer concentric walls forming an annular space and together constituting a race; main rollers working in said race; separator-rollers between the main rollers, each separator-roller working with its axis in substantially the same plane as the axes of the adjoining main rollers, the main rollers having guiding edges, the separator-rollers having coöperating guiding edges to keep the main rollers in parallelism, and the race having guiding edges coöperating with the said guiding edges of the main rollers and acting to sustain end thrust of said main rollers, the guiding edges of each main roller working between the coöperating guiding edges of the adjoining separator-rollers, said main rollers being free to twist within the limits allowed by the separator-rollers; and means to prevent radial displacement of the separator-rollers.

9. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers and having ends projecting beyond the main rollers, each separator-roller working with its axis in substantially the same plane as the axes of the adjoining main rollers, the main rollers having guiding edges and the separator-rollers having coöperating guiding edges to keep the main rollers in parallelism, said main rollers being free to twist within the limits allowed by the separator-rollers; and means to prevent radial displacement of the separator-rollers.

10. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers and having ends projecting beyond the main rollers and provided with enlargements; each separator-roller working with its axis in substantially the same plane as the axes of the adjoining main rollers, the main rollers having guiding edges and the separator-rollers having coöperating guiding edges on said enlargements to keep the main rollers in parallelism, said main rollers being free to twist within the limits allowed by the separator-rollers; and means coöperating with said projecting ends of the separator-rollers to prevent radial displacement of the separator-rollers.

11. In a roller-bearing, the combination of inner and outer concentric walls forming an annular space and together constituting a race; main rollers working in said race; separator-rollers between the main rollers and having ends projecting beyond the main rollers and provided with enlargements, each separator-roller working with its axis in substantially the same plane as the axes of the adjoining main rollers, the main rollers having guiding edges and the separator-rollers having coöperating guiding edges on said enlargements to keep the main rollers in parallelism, and the race having guiding edges coöperating with the said guiding edges of the main rollers and acting to sustain end thrust of said main rollers, said main rollers being free to twist within the limits allowed by the separator-rollers; and means coöperating with said projecting ends of the separator-rollers to prevent radial displacement of the separator-rollers.

12. In a roller-bearing, the combination of inner and outer concentric walls forming an annular space and together constituting a race; main rollers working in said race; separator-rollers working between the main rollers, and having ends projecting beyond the main rollers, each separator-roller working with its axis in substantially the same plane as the axes of the adjoining main rollers, the main rollers having guiding edges and the separator-rollers having coöperating guiding edges to keep the main rollers in parallelism, said guiding edges of the main and separator rollers working on each other at an angle to the axes of said rollers and the race having guiding edges coöperating with the main rollers and acting to sustain end thrust of said main rollers, said main rollers being free to twist within the limits allowed by the separator-rollers; and means coöperating with said projecting ends of the separator-rollers to prevent radial displacement of the separator-rollers.

13. In a roller-bearing, the combination of inner and outer concentric walls forming an annular space and together constituting a race; main rollers working in said race; separator-rollers between the main rollers and having ends projecting beyond the main rollers, each separator-roller working with its axis in substantially the same plane as the axes of the adjoining main rollers, the main rollers having guiding edges, the separator-rollers having coöperating guiding edges to keep the main rollers in parallelism, and the race having guiding edges coöperating with the said guiding edges of the main rollers and acting to sustain end thrust of the main rollers, the guiding edges of the race and of the main rollers working on each other at an angle to the axes of the main rollers, said main rollers being free to twist within the limits allowed by the separator-rollers; and means coöperating with the projecting ends of the separator-rollers to prevent radial displacement of the separator-rollers.

14. In a roller-bearing, the combination of inner and outer concentric walls forming an annular space and together constituting a race; main rollers working in said race; separator-rollers between the main rollers and having ends projecting beyond the main rollers, each separator-roller working with its axis in substantially the same plane as the axes of the adjoining main rollers, the main rollers having guiding edges, the separator-rollers having coöperating guiding edges to keep the main rollers in parallelism, and the race having guiding edges coöperating with the said guiding edges of the main rollers and acting to sustain end thrust of said main rollers, said main rollers being free to twist within the limits allowed by the separator-rollers; retainer-caps coöperating with said projecting ends of the separator-rollers to prevent outward radial displacement of said separator-rollers; and means coöperating with said projecting ends of the separator-rollers to prevent inward radial displacement of said separator-rollers.

15. In a roller-bearing, the combination of inner and outer concentric walls forming an annular space and together constituting a race; main rollers working in said race; separator-rollers working between the main rollers, and having ends projecting beyond the main rollers and provided with enlargements, each separator-roller working with its axis in substantially the same plane as the axes of the adjoining main rollers, the main rollers having guiding edges and the separator-rollers having coöperating guiding edges on said enlargements to keep the main rollers in parallelism, and the race having guiding edges coöperating with the main rollers and acting to sustain end thrust of said main rollers, said main rollers being free to twist within the limits allowed by the separator-rollers; and means coöperating with said projecting ends of the separator-rollers to prevent radial displacement of the separator-rollers.

16. In a roller-bearing, the combination of inner and outer concentric walls forming an annular space and together constituting a race; main rollers working in said race; separator-rollers working between the main rollers, and having ends projecting beyond the main rollers, each separator-roller working with its axis in substantially the same plane as the axes of the adjoining main rollers, the main rollers having guiding edges and the separator-rollers having coöperating guiding edges to keep the main rollers in parallelism, and the race having guiding edges coöperating with the ends of said main rollers and acting to sustain end thrust of said main rollers, said main rollers being free to twist within the limits allowed by the separator-rollers; and means coöperating with the said projecting ends of the separator-rollers to prevent radial displacement of the separator-rollers.

17. In a roller-bearing, the combination of inner and outer concentric walls forming an annular space and together constituting a race; main rollers working in said race; separator-rollers working between the main rollers, and having ends projecting beyond the main rollers and provided with enlargements, each separator-roller working with its axis in substantially the same plane as the axes of the adjoining main rollers, the main rollers having guiding edges and the separator-rollers having coöperating guiding edges on said enlargements to keep the main rollers in parallelism, and the race having guiding edges coöperating with the said guiding edges of the main rollers and acting to sustain end thrust of said main rollers, said guiding edges on the race and on the main rollers working on each other at an angle to the axes of said rollers, and said main rollers being free to twist within the limits allowed by the separator-rollers; retainer-caps coöperating with said projecting ends of the separator-rollers to prevent outward radial displacement thereof; and means coöperating with said projecting ends of the separator-rollers to prevent inward radial displacement thereof.

18. In a roller-bearing, the combination of inner and outer concentric walls forming an annular space and together constituting a race; main rollers working in said race; separator-rollers working between the main rollers, and having ends projecting beyond the main rollers, each separator-roller working with its axis in substantially the same plane as the axes of the adjoining main rollers, the main rollers having guiding edges and the separator-rollers having coöperating guiding edges to keep the main rollers in parallelism, said guiding edges of the main and separator rollers working on each other at an angle to the axes of said rollers and the race having guiding edges coöperating with the main rollers and acting to sustain end thrust of said main rollers, said guiding edges on the race and on the main rollers working on each other at an angle to the axes of said rollers, and said main rollers being free to twist within the limits allowed by the separator-rollers; and means coöperating with said projecting ends of the separator-rollers to prevent radial displacement of the separator-rollers.

19. In a roller-bearing, the combination of inner and outer concentric walls forming an annular space and together constituting a race; main rollers working in said race, the race having beveled guiding edges coöperating with the main rollers and operating to sustain end thrust of said rollers; separator-rollers between the main rollers, each separator-roller working with its axis in substantially the same plane as the axes of the adjoining main rollers, the main rollers having guiding edges and the separator-rollers having coöperating guiding edges to keep the main rollers in parallelism, said main rollers being free to twist within the limits allowed by the separator-rollers; and means to prevent radial displacement of the separator-rollers.

20. In a roller-bearing the combination of inner and outer concentric walls forming an annular space and together constituting a race; main rollers working in said race, the race having beveled guiding edges coöperating with the main rollers and operating to sustain end thrust of said rollers; separator-rollers between the main rollers, each separator-roller working with its axis in substantially the same plane as the axes of the adjoining main rollers, the main rollers having guiding edges and the separator-rollers having coöperating beveled guiding edges to keep the main rollers in parallelism, said main rollers being free to twist within the limits allowed by the separator-rollers; and means to prevent radial displacement of the separator-rollers.

21. In a roller-bearing, the combination of inner and outer concentric walls forming an annular space and together constituting a race; main rollers working in said race; separator-rollers working between the main rollers, and having ends projecting beyond the main rollers and provided with enlargements, each separator-roller working with its axis in substantially the same plane as the axes of the adjoining main rollers, the main rollers having guiding edges and the separator-rollers having coöperating beveled guiding edges on said enlargements to keep the main rollers in parallelism, and the race having beveled guiding edges coöperating with the said guiding edges of the main rollers and acting to sustain end thrust of said main rollers, said main rollers being free to twist within the limits allowed by the separator-rollers; retainer-caps fixed on the part carrying the inner wall of the race and coöperating with the said projecting ends of the separators to prevent outward radial displacement thereof; and means coöperating with said projecting ends of the separator-rollers to prevent inward radial displacement thereof.

22. In a roller-bearing, the combination of inner and outer concentric walls forming an annular space and together constituting a race; main rollers working in said race; separator-rollers working between the main rollers, and having ends projecting beyond the main rollers and provided with enlargements, each separator-roller working with its axis in substantially the same plane as the axes of the adjoining main rollers, the main rollers having guiding edges and the separator-rollers having coöperating beveled guiding edges on said enlargements to keep the main rollers in parallelism, and the race having beveled guiding edges coöperating with the said guiding edges of the main rollers and acting to sustain end thrust of said main rollers, said main rollers being free to twist within the limits allowed by the separator-rollers; retainer-caps fixed on the part carrying the inner wall of the race and coöperating with the ends of the said projecting ends of the separators to prevent outward radial displacement thereof; and means coöperating with said projecting ends of the separator-rollers to prevent inward radial displacement thereof, said means consisting of ribs formed on the inner wall of the race.

23. In a roller-bearing, the combination of inner and outer concentric walls forming an annular space and together constituting a race; main rollers working in said race, the race having guiding edges coöperating with the main rollers and operating to sustain end thrust of said rollers; separator-rollers between the main rollers and having ends projecting beyond the main rollers, the main rollers having guiding edges and the separator-rollers having coöperating guiding edges to keep the main rollers in parallelism, said main rollers being free to twist within the limits allowed by the separator-rollers; and means to prevent radial displacement of the separator-rollers.

24. In a roller-bearing, the combination of inner and outer concentric walls forming an annular space and together constituting a race; main rollers working in said race; separator-rollers working between the main rollers, and having ends projecting beyond the main rollers and provided with enlargements, the main rollers having guiding edges the separator-rollers having coöperating guiding edges on said enlargements to keep the main rollers in parallelism, and the race having guiding edges coöperating with the main rollers and acting to sustain end thrust of said main rollers, said main rollers being free to twist within the limits allowed by the separator-rollers; and means coöperating with said projecting ends of the separator-rollers to prevent radial displacement of the separator-rollers.

MYRON FRANCIS HILL.

Witnesses:
   FREDERICK B. HILL,
   JAMES J. MORRISSEY.